United States Patent
Kitoh et al.

(10) Patent No.: US 9,767,740 B2
(45) Date of Patent: Sep. 19, 2017

(54) TOUCH PANEL DISPLAY DEVICE COMPRISING AN INSULATOR PORTION THAT LIMITS INTRUSION OF DUST INTO A GAP

(71) Applicant: DENSO CORPORATION, Kariya, Aichi-pref. (JP)

(72) Inventors: Kazuo Kitoh, Nagoya (JP); Tsubasa Kawashita, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 240 days.

(21) Appl. No.: 14/763,348

(22) PCT Filed: Jan. 16, 2014

(86) PCT No.: PCT/JP2014/000176
§ 371 (c)(1),
(2) Date: Jul. 24, 2015

(87) PCT Pub. No.: WO2014/119236
PCT Pub. Date: Aug. 7, 2014

(65) Prior Publication Data
US 2015/0356931 A1    Dec. 10, 2015

(30) Foreign Application Priority Data

Jan. 30, 2013 (JP) .................. 2013-016042
Jun. 11, 2013 (JP) .................. 2013-122921

(51) Int. Cl.
*G09G 3/36*    (2006.01)
*G06F 3/041*   (2006.01)
(Continued)

(52) U.S. Cl.
CPC ............ *G09G 3/36* (2013.01); *G01C 21/265* (2013.01); *G02F 1/13338* (2013.01);
(Continued)

(58) Field of Classification Search
CPC .............................. G09F 9/00; G01C 21/265
See application file for complete search history.

(56) References Cited

U.S. PATENT DOCUMENTS

2009/0180244 A1* 7/2009 Kiyohara ............ G02F 1/13338
361/679.01
2011/0227848 A1* 9/2011 Furusawa ............. G06F 1/1626
345/173
(Continued)

FOREIGN PATENT DOCUMENTS

JP   H07199160 A   8/1995
JP   H10207630 A   8/1998
(Continued)

OTHER PUBLICATIONS

International Search Report and Written Opinion (in Japanese with English Translation) for PCT/JP2014/000176, mailed Mar. 11, 2014; ISA/JP.

*Primary Examiner* — Paul Lee
(74) *Attorney, Agent, or Firm* — Harness, Dickey & Pierce, P.L.C.

(57) ABSTRACT

A display device includes a display, which has a display surface, and a touch panel, which is spaced from and is opposed to the display surface. An opening of a panel frame portion-relative to the touch panel is formed to be larger than an opening of a front case relative to the display unit. An insulator portion extends toward a center of the opening of the front case beyond an inner peripheral part of the front case to mask the front case from eyesight of a user.

9 Claims, 3 Drawing Sheets

(51) Int. Cl.
*G06F 1/16* (2006.01)
*G02F 1/1333* (2006.01)
*G09F 9/00* (2006.01)
*G01C 21/26* (2006.01)

(52) U.S. Cl.
CPC .......... *G06F 1/1626* (2013.01); *G06F 1/1643* (2013.01); *G06F 3/041* (2013.01); *G06F 3/0412* (2013.01); *G09F 9/00* (2013.01); *G06F 2203/04103* (2013.01)

(56) References Cited

U.S. PATENT DOCUMENTS

2011/0260991 A1 10/2011 Aono
2012/0062492 A1* 3/2012 Katoh ............... G02F 1/133308
　　　　　　　　　　　　　　　　　　　　　　345/173

FOREIGN PATENT DOCUMENTS

| JP | 2004355593 A | 12/2004 |
| JP | 2009163990 A | 7/2009 |
| JP | 2010044467 A | 2/2010 |
| JP | 2011034150 A | 2/2011 |
| JP | 2012243261 A | 12/2012 |

* cited by examiner

TOUCH PANEL DISPLAY DEVICE COMPRISING AN INSULATOR PORTION THAT LIMITS INTRUSION OF DUST INTO A GAP

CROSS REFERENCE TO RELATED APPLICATIONS

This application is a U.S. National Phase Application under 35 U.S.C. 371 of International Application No. PCT/JP2014/000176 filed on Jan. 16, 2014 and published in Japanese as WO 2014/119236 A1 on Aug. 7, 2014. This application is based on and claims the benefit of priority from Japanese Patent Application No. 2013-16042 filed on Jan. 30, 2013 and Japanese Patent Application No. 2013-122921 filed on Jun. 11, 2013. The entire disclosures of all of the above applications are incorporated herein by reference.

TECHNICAL FIELD

The present disclosure relates to a display device.

BACKGROUND ART

For instance, a display device disclosed in Patent Literature 1 is known as a prior art display device. In the display device of Patent Literature 1, a touch panel is placed on a side where a display surface of a display unit (LCD) is placed, and the display unit and the touch panel are received in a housing. An opening is formed in a surface of the housing, which is opposed to the touch panel. An operating surface of the touch panel is visible from the opening of the housing. Furthermore, a rubber frame is interposed between an outer peripheral portion of the display unit and an outer peripheral portion of the touch panel to form a predetermined gap between the display unit and the touch panel. Furthermore, a packing is interposed between an outer peripheral surface of the touch panel and a periphery of the opening of the housing to implement waterproof, drip-proof, and dust-proof.

However, normally, a metal frame body (a front case) is placed at an outer peripheral portion of the display unit at the display surface side. Furthermore, a size of the opening of the housing (a touch panel cover) is made as large as possible in order to ensure a sufficient operating function for the touch panel. Therefore, in the case of the display device, in which a size of the opening of the housing is set to be larger than a size of the opening of the frame body, a user can see a portion of the frame body through the touch panel. When an external light is reflected by the frame body, the frame body is brightened. Therefore, a visual quality of the display device is disadvantageously deteriorated.

In order to prevent this phenomenon, it is conceivable to interpose a masking member, which masks the frame body, between the display unit (the frame body) and the touch panel. However, this will cause an increase in the number of the components. Furthermore, in order to reliably mask the frame body with a minimum size of the masking member, installation of the masking member needs to be performed with a high positioning accuracy. Thereby, it is difficult to adjust the manufacturing.

CITATION LIST

Patent Literature

Patent Literature 1: JPH10-207630A

SUMMARY OF INVENTION

In view of the above disadvantage, it is an objective of the present disclosure to provide a display device, which can limit deterioration of a visual quality of the display device caused by reflection at a frame body without increasing the number of components.

In order to achieve the above objective, according to the present disclosure, there is provided a display device that includes a display unit, a touch panel, a front case, a touch panel cover, a spacer portion, and an insulator portion. The display unit has a display surface. The touch panel is spaced from and is opposed to the display surface of the display unit in a direction perpendicular to the display surface. Furthermore, the touch panel has an operating surface that is operable with a finger of a user to change display content of the display surface. The front case is made of metal and is configured into a frame form, and the front case covers at least an outer peripheral part of the display surface of the display unit. The touch panel cover includes an outer peripheral cover portion, which is configured into a tubular form and covers outer peripheral surfaces of the display unit and of the touch panel, and a panel frame portion, which covers an outer peripheral part of the operating surface of the touch panel. The spacer portion is placed between the outer peripheral cover portion and the outer peripheral surfaces of the display unit and of the touch panel. The spacer portion limits a position of the display unit and a position of the touch panel relative to the outer peripheral cover portion. The insulator portion is formed integrally with the spacer portion and is placed between the display unit and the front case. The insulator portion forms a gap of a predetermined dimension between the display unit and the touch panel and seals between the front case and the touch panel to limit intrusion of dust into the gap. An opening of the panel frame portion relative to the touch panel is formed to be larger than an opening of the front case relative to the display unit. The insulator portion extends toward a center of the opening of the front case beyond an inner peripheral part of the front case in a direction parallel to the display surface of the display unit to mask the front case from eyesight of the user.

DESCRIPTION OF EMBODIMENTS

Various embodiments of the present disclosure will be described with reference to the accompanying drawings. In the following respective embodiments, portions, which are described in a previous embodiment(s), will be indicated by the same reference numerals and will not be redundantly described in some cases. In each of the following embodiments, if only a part of a structure is described, the remaining part of the structure is the same as that of the previously described embodiment(s). Besides the combination(s) of the components, which is expressly described in the respective embodiments, the embodiments may be partially combined with one another as long as there is no problem with respect to such a combination even if such a combination is not explicitly disclosed.

First Embodiment

Figure 1:
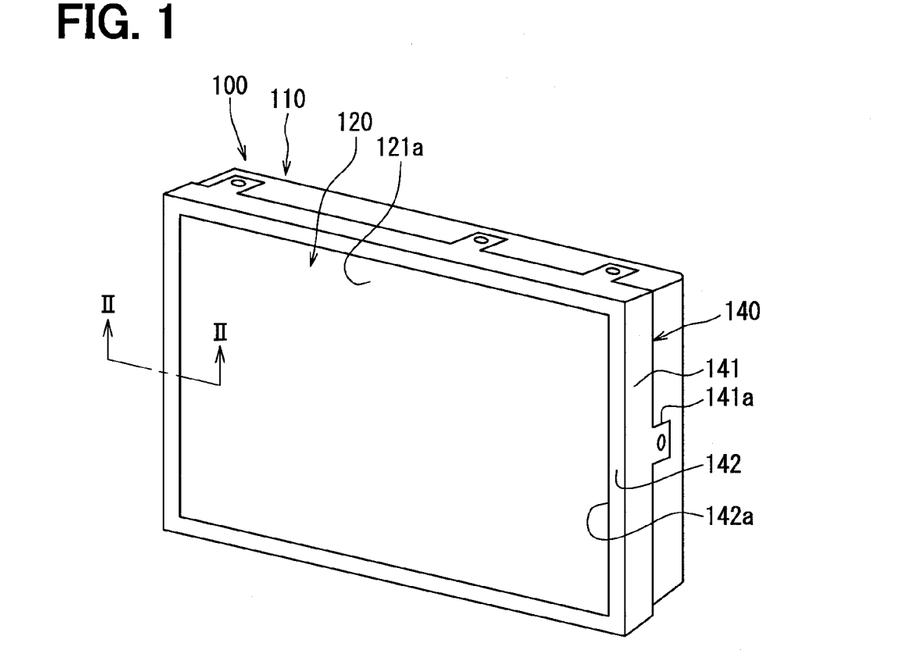
FIG. 1 is a perspective view showing a display device according to a first embodiment of the present disclosure.
Figure 2:
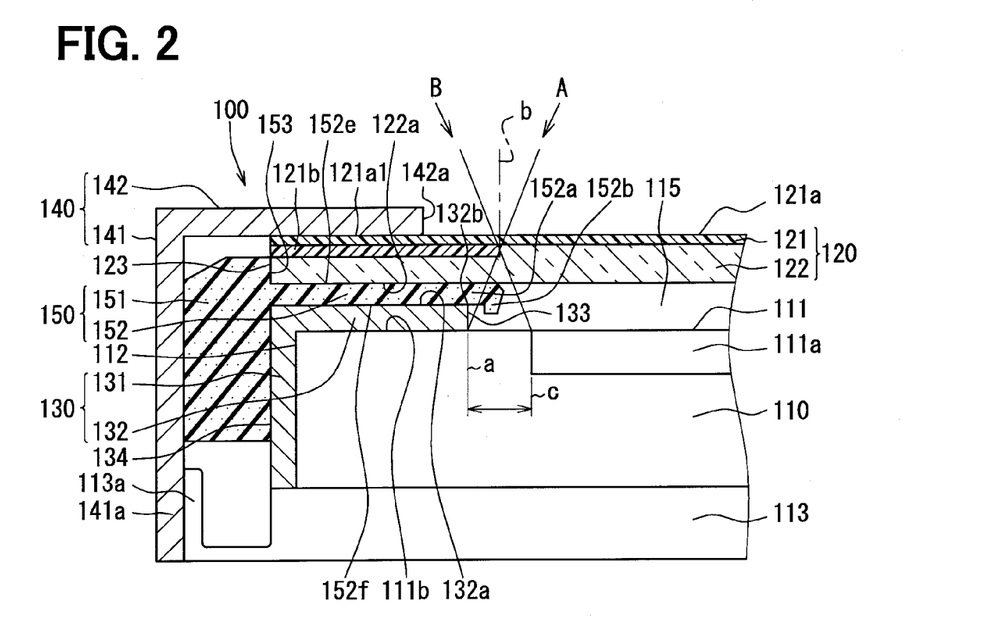
FIG. 2 is a partial cross-sectional view taken along line II-II in FIG. 1.

A display device 100 according to a first embodiment of the present disclosure will be described with reference to FIGS. 1 and 2. The display device 100 of the present embodiment is, for example, a display device, which has a touch panel and is applied to a navigation system for a vehicle. The display device 100 is placed at a location, such as an upper part of a center location of an instrument panel of the vehicle, where the display device 100 is easily viewable by a driver of the vehicle. The display device 100 displays a map, a current location and a traveling direction of the own vehicle on the map, and guidance information for a desirable destination on a display 110, as various information (predetermined information) at the car navigation system. The driver (a user) can perform an input operation for changing display content through a finger operation, such as finger touch, finger slide, on an operating surface 121a of a touch panel 120, thereby allowing the change of the display content to information requested by the driver. The display device 100 includes the display 110, the touch panel 120, a front case 130, a touch panel cover 140, and a spacer 150.

The display 110 is a display unit, which is configured into a planar rectangular form and can change and display the above-described various information on a display area 111a of a display surface 111. A surface, which is formed to extend in a direction (a thickness direction) that is perpendicular to the display surface 111 in an outer peripheral part of the display 110, forms an outer peripheral surface 112. The display 110 may be formed by, for example, a liquid crystal display, an organic EL display.

A board unit (a control circuit board) 113 is formed at an opposite surface of the display 110, which is opposite from the display surface 111. The board unit 113 includes, for example, a control device that controls a display state of various information based on an input signal (the finger operation) from the touch panel 120 described later. Fixing parts 113a, to which the touch panel cover 140 described later is fixed, are formed at predetermined locations of the outer peripheral surface of the board unit 113 that is formed to extend in the direction (the thickness direction), which is perpendicular to the display surface 111 of the board unit 113.

The touch panel 120 is a position sensing device, which is transparent and is configured into a rectangular plate form that corresponds to the display 110. The touch panel 120 is placed at a corresponding location where the touch panel 120 is opposed to the display surface 111 of the display 110. Specifically, the touch panel 120 is spaced from and is opposed to the display surface 111 of the display 110 in a direction that is perpendicular to the display surface 111. When the driver touches the surface (the operating surface 121a) of the touch panel 120 with his/her finger, the touch panel 120 senses a position (a position coordinate in a left to right direction and a top to bottom direction) of a touched location of the touch panel 120, which is touched with the finger, and outputs the sensed position as a position signal to the board unit 113.

Various types of touch panels, such as a capacitive touch panel or a resistive touch panel, may be used as the touch panel 120. In the present embodiment, the touch panel 120 is described as the capacitive touch panel (a self-capacitive touch panel). The capacitive touch panel 120 is a touch panel that generates the position signal, which indicates the position of the finger on the touch panel 120, based on a change in the capacitance generated between a finger tip of the driver and a plurality of electrodes formed in the touch panel 120 in response to the position of the finger.

The touch panel 120 is formed by bonding a cover film 121 and a glass plate 122 together. The cover film 121 is a thin film, which is transparent and has a thickness of, for example, about 0.5 mm. The cover film 121 is placed on an opposite side, which is opposite from the display 110 in a direction that is perpendicular to the display surface 111 of the display 110. Furthermore, the glass plate 122 is a plate that is transparent and has a thickness of, for example, 1 mm. The glass plate 122 is placed on the display 110 side in the direction perpendicular to the display surface 111 of the display 110. A surface of the cover film 121, which is located at an outer side (the driver side), forms the operating surface 121a that is operated with the finger of the driver.

The electrodes, which are transparent and are arranged in a matrix pattern, are formed in the cover film 121. Furthermore, a portion of connection lines, which connect between the electrodes and the board unit 113, is placed at an outer peripheral side of a surface of the cover film 121 located on the glass plate 122 side. A black print portion 121b is formed in a form of a frame at the cover film 121 to black out the connection line, which is placed at the outer peripheral side of the surface of the cover film 121. A surface, which is formed to extend in a direction (a thickness direction) perpendicular to the operating surface 121a at an outer peripheral portion of the touch panel 120 formed by the cover film 121 and the glass plate 122, forms an outer peripheral surface 123.

The front case 130 is a metal case, which is configured into a frame form and covers the outer peripheral side of the display 110. The front case 130 includes an outer peripheral portion 131, which covers the outer peripheral surface 112 of the display 110, and a flange portion 132, which is bent at an end part of the outer peripheral portion 131 located on the display surface 111 side and covers an outer peripheral part 111b of the display surface 111. An inner side region of the flange portion 132, which is located on an inner side in a direction (a direction parallel to the display surface 111) that is along the display surface 111, is an opening 133, which allows the driver to view the display area 111a. The front case 130 has a plate thickness of, for example, about 0.3 mm.

Here, a line position (a in FIG. 2) of the opening 133 of the front case 130 is displaced slightly (e.g., about 0.45 mm) on the outer peripheral surface 112 side from an inner side line position (b in FIG. 2) of the black print portion 121b, which is configured into the frame form at the cover film 121. Furthermore, an outer peripheral line position (c in FIG. 2) of the display area 111a is displaced slightly (e.g., about 0.45 mm) on the center side of the display 110 from the inner side line position (b in FIG. 2) of the black print portion 121b.

The touch panel cover 140 is a metal cover that is configured into a frame form and covers the outer peripheral side of the display 110 and the outer peripheral side of the touch panel 120 while the metal cover is fixed to the fixing parts 113a of the board unit 113. The touch panel cover 140 includes an outer peripheral cover portion 141 and a panel frame portion 142. The outer peripheral cover portion 141 is configured into a rectangular tubular form and covers the outer peripheral surface 112 of the display 110 and the outer peripheral surface 123 of the touch panel 120. The panel frame portion 142 is bent at an end part of the outer peripheral cover portion 141 located on the operating surface 121a side of the touch panel 120 and covers an outer peripheral part 121a1 of the operating surface 121a. A plurality of projections 141a is formed in the outer peripheral cover portion 141 at corresponding locations, which correspond to the locations of the fixing parts 113a of the board unit 113. An inner side region of the panel frame portion 142, which is located on the inner side in the direction along the operating surface 121a, is an opening 142a that allows the driver to view the operating surface 121a.

Here, an opening line position of the opening 142a is located on the outer peripheral cover portion 141 side of the inner side line position (b in FIG. 2) of the black print portion 121b of the cover film 121 and of the line position (a in FIG. 2) of the opening 133 of the front case 130. This is for the reason of providing a sufficient surface area of the operating surface 121a of the touch panel 120 and for the reason of limiting overlapping between the panel frame portion 142 and the electrodes of the touch panel 120 to limit placement of the electrodes into the electrically conducted state all the time.

The spacer 150 is a positioning and dust limiting insert member, which is seamlessly and integrally molded from a material (a resilient material or the like), such as a rubber material having some degree of hardness or a resin material having some degree of resiliency. The spacer 150 includes a spacer portion 151 and an insulator portion 152, and the insulator portion 152 is formed integrally with the spacer portion 151. The spacer 150 is a spacer of, for example, a black color.

The spacer portion 151 is configured into a rectangular frame form (tubular form) to contact an outer peripheral surface 134 of the outer peripheral portion 131 and the outer peripheral surface 123 of the touch panel 120. The spacer portion 151 is a member that limits (positioning) a position of the display 110 and a position of the touch panel 120 relative to each other in a view taken from the driver side.

Furthermore, the insulator portion 152 is formed by extending it from a tubular inner peripheral surface of the spacer portion 151 in the direction along the display surface 111 of the display 110 while the insulator portion 152 has a predetermined thickness. The insulator portion 152 has a thickness of, for example, about 0.5 mm. The insulator portion 152 is clamped between a surface 132a of the flange portion 132 of the front case 130 and a surface 122a of the glass plate 122 of the touch panel 120. The glass plate 122 and the flange portion 132 are spaced from each other by the insulator portion 152 by the amount that corresponds to the thickness (0.5 mm) of the insulator portion 152. A gap 115 of a predetermined dimension is formed between the display surface 111 and the glass plate 122 by the insulator portion 152. Here, the predetermined dimension is a dimension (0.8 mm), which is obtained by adding a thickness (0.3 mm) of the flange portion 132 to the thickness (0.5 mm) of the insulator portion 152. By forming the gap 115 of this kind, an erroneous operation of the electrodes at the touch panel 120 is limited.

The insulator portion 152 extends to cover the flange portion 132 in the view taken from the driver side. Furthermore, a bent section 152b, which is bent toward the display surface 111, is formed in an extended distal end part 152a of the insulator portion 152. A position, at which the bent section 152b is formed, is located between the line position (a in FIG. 2) of the opening 133 and the outer peripheral line position (c in FIG. 2) of the display area 111a.

The spacer 150 is molded such that a molten material (e.g., a rubber material, a resin material) is injected into a mold, so that the spacer portion 151 and the insulator portion 152 are integrally molded. Thereby, in an unassembled state of the spacer 150, variations in dimensions of the respective parts, such as the thickness of the insulator portion 152 and the length of the insulator portion 152 in the extending direction, are ensured by the precision of the mold.

The display device 100, which includes the above described components, is assembled in the following manner. That is, the spacer 150 is installed to the outer peripheral portion of the display 110, to which the front case 130 is installed. A bent distal end of the bent section 152b is directed toward the display surface 111. At this time, the spacer portion 151 contacts the outer peripheral portion 131 of the front case 130, and the insulator portion 152 contacts the flange portion 132 of the front case 130. Furthermore, the bent section 152b reaches an inner side region (between the line position a and the line position c in FIG. 2) located on the inner side of the opening 133 of the flange portion 132.

Next, the touch panel 120 is installed such that the touch panel 120 is received at a stepped part 153, which is configured into a frame form and is formed by the spacer portion 151 and the insulator portion 152, while the glass plate 122 is opposed to the display surface 111. At this time, the spacer portion 151 contacts the outer peripheral surface 123 of the touch panel 120, and the insulator portion 152 contacts the glass plate 122.

The outer peripheral surface 134 of the outer peripheral portion 131 of the front case 130 and the outer peripheral surface 123 of the touch panel 120 contact the spacer portion 151, so that the position of the outer peripheral surface 112 of the display 110 and the position of the outer peripheral surface 123 of the touch panel 120 are limited. Thereby, the display 110 and the touch panel 120 are positioned to overlap with each other in the view taken from the driver side.

The touch panel cover 140 is installed from the operating surface 121a side to case over the corresponding parts. At this time, the spacer portion 151 receives predetermined compression in the direction along the display surface 111, so that the inner side surface of the outer peripheral cover portion 141 contacts the outer peripheral surface of the spacer portion 151. Also, at this time, the panel frame portion 142 contacts the operating surface 121a of the touch panel 120. Thus, the position of the display 110 and the position of the touch panel 120 relative to the outer peripheral cover portion 141 and the panel frame portion 142 are limited.

Furthermore, a predetermined force is applied in a direction, along which the display 110 and the touch panel 120 are placed one after another to overlap with each other (a direction that is perpendicular to the display surface 111 of the display 110), and the projections 141a are fixed to the fixing parts 113a with fixing members, such as bolts. Thus, the insulator portion 152 is clamped between the display 110

(the flange portion 132 of the front case 130) and the touch panel 120 and is thereby placed into the compressed state, and a space between the display 110 (the front case 130) and the touch panel 120 is sealed with the insulator portion 152. The gap 115 is formed between the display 110 and the touch panel 120. The intrusion of, for example, dust and/or dirt into the gap 115 from the outside is prevented or limited by the seal function of the insulator portion 152.

In the present embodiment, the opening 142a of the panel frame portion 142 relative to the touch panel 120 (the operating surface 121a) is formed to be larger than the opening 133 of the front case 130 (the flange portion 132) relative to the display 110 (the display surface 111). Therefore, in this state, if there is no further modification, a portion of the front case 130 may be seen from the user side through the touch panel 120. That is, the driver can see the front case 130 through the touch panel 120 in a direction (a direction A in FIG. 2), which connects the line position a of the opening 133 and the inner side line position b of the black print portion 121b.

However, in the present embodiment, the insulator portion 152, which is formed integrally with the spacer portion 151, extends toward a center of the opening 133 of the flange portion 132 of the front case 130 beyond an inner peripheral part 132b of the front case 130 in a direction parallel to the display surface 111 of the display 110. In this way, the insulator portion 152 covers the front case 130 (the flange portion 132) and masks the front case 130 (the flange portion 132) from the eyesight of the driver (the user). Thereby, the insulator portion 152, which forms the gap 115 of the predetermined dimension between the display 110 and the touch panel 120 and prevents or limits the intrusion of the dust into the gap 115, is additionally used to mask the front case 130 (the flange portion 132) without increasing the number of the components, and thereby it is possible to limit the deterioration of the visual quality of the display device caused by reflection of the light at the front case 130.

The distal end part 152a (the bent section 152b) of the insulator portion 152 is positioned between the line position a of the opening 133 and the outer peripheral line position c of the display area 111a. Therefore, the display area 111a is not masked by the distal end part 152a (the bent section 152b) in a view taken in a direction (a direction B in FIG. 2), which connects between the outer peripheral line position c and the inner side line position b.

Furthermore, the insulator portion 152 is formed integrally with the spacer portion 151. Therefore, the position of the distal end part 152a (the bent section 152b) of the insulator portion 152 in the extending direction of the insulator portion 152 can be limited within a range of dimension variation of the spacer 150, which integrally includes the spacer portion 151 and the insulator portion 152, in the unassembled state of the spacer 150. Therefore, the position of the distal end part 152a (the bent section 152b) is self-determined within the range of dimension variation, which is set by using the outer peripheral surface 112, 123 of the display 110 and of the touch panel 120 as references, at the time of installing the spacer portion 151 to the display 110 and the touch panel 120. Thus, there is no need to worry about the generation of the variations in the position of the distal end part 152a (the bent section 152b) caused by the assembling, and the assembling, which reliably masks the front case 130 (the flange portion 132), is eased.

Furthermore, in the present embodiment, the bent section 152b, which is bent toward the display surface 111, is formed in the extended distal end part 152a of the insulator portion 152. Thereby, the front case 130 (the flange portion 132) can be reliably masked without excessively extending the insulator portion 152. That is, an effective surface area of the display surface 111 of the display 110 will not be unnecessarily reduced.

Second Embodiment

Figure 3:
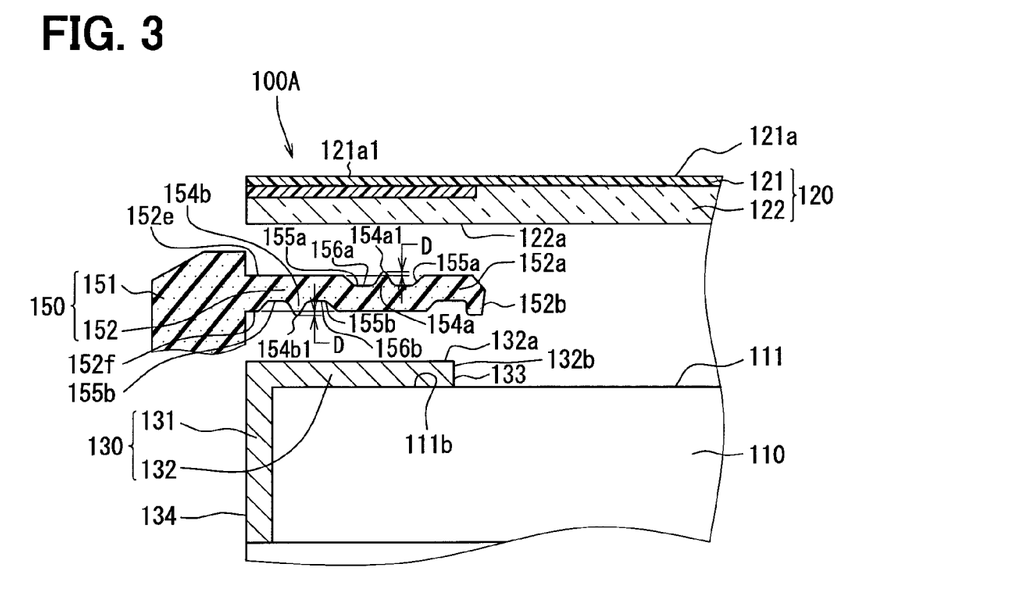
FIG. 3 is a partial cross-sectional view of a display device according to a second embodiment of the present disclosure, indicating a cross section of the display device, which corresponds to the cross section taken along line II-II in FIG. 1.

FIG. 3 shows a display device 100A according to a second embodiment of the present disclosure. The second embodiment is an embodiment, in which a touch panel side ridge 154a and a front case side ridge 154b (hereinafter also referred to as ridges 154a, 154b) are added to the insulator portion 152 in the first embodiment discussed above.

A touch panel side recess 156a is recessed in a surface (planar surface) 152e of the insulator portion 152, which is opposed to the touch panel 120. The touch panel side ridge 154a projects from a bottom surface of the touch panel side recess 156a toward the corresponding surface (the planar surface) 122a of the touch panel 120. A distal end part 154a1 of the touch panel side ridge 154a contacts the surface 122a of the touch panel 120 at an opening end of the touch panel side recess 156a. The touch panel side ridge 154a has a cross section that is tapered toward the distal end part 154a1 in a direction perpendicular to the surface 122a of the touch panel 120. The cross section of the touch panel side ridge 154a is configured into a triangular form, so that the distal end part 154a1 of the touch panel side ridge 154a makes a line contact with the surface 122a of the touch panel 120. The distal end part 154a1 forms an acute angle.

A front case side recess 156b is recessed in a surface (planar surface) 152f of the insulator portion 152, which is opposed to the flange portion 132. The front case side ridge 154b projects from a bottom surface of the front case side recess 156b toward the corresponding surface (the planar surface) 132a of the front case 130, which corresponds to the flange portion 132. A distal end part 154b1 of the front case side ridge 154b contacts the surface 132a of the front case 130 at an opening end of the front case side recess 156b. The front case side ridge 154b has a cross section that is tapered toward the distal end part 154b1 of the front case side ridge 154b in a direction perpendicular to the corresponding surface 132a of the flange portion 132. The cross section of the front case side ridge 154b is configured into a triangular form, so that the distal end part 154b1 of the front case side ridge 154b makes a line contact with the surface 132a of the flange portion 132. The distal end part 154b1 forms an acute angle.

The configuration of the cross section of the touch panel side ridge 154a and the configuration of the cross section of the front case side ridge 154b are not limited to the triangular form and may be any other shape as long as the cross section of the touch panel side ridge 154a and the cross section of the front case side ridge 154b are respectively tapered toward its distal end part 154a1, 154b1. Furthermore, depending on a need, the distal end part 154a1, 154b1 may be rounded by chamfering. At this time, the distal end part 154a1, 154b1 may be configured to make a surface contact against the surface 122a, 132a, against which the distal end part 154a1, 154b1 is opposed. In the insulator portion 152, the touch panel side ridge 154a and the front case side ridge 154b extend in each of corresponding directions that are along four sides, respectively, of the display 110 (and the touch panel 120) configured into the rectangular form. In the touch panel side recess 156a, two grooves 155a are formed at two opposite sides (a left side and a right side in FIG. 3), respectively, of the touch panel side ridge 154a. Similarly, in the front case side recess 156b, two grooves 155b are formed at two opposite sides (a left side and a right side in FIG. 3), respectively, of the front case side ridge 154b. The actual projection dimension of the ridges 154a, 154b, which is measured from the bottom surface of the recess 156a, 156b, is made large by the grooves 155a, 155b.

In a case where the corresponding surface 152e, 152f of the insulator portion 152 is set as a reference surface, the projection dimension (a dimension line D in FIG. 3) of each ridge 154a, 154b, which is measured from the corresponding surface 152e, 152f, is, for example, about 0.05 mm, and a depth of the recess 156a, 156b (the groove 155a, 155b), which is measured from the corresponding surface 152e, 152f, is, for example, about 0.15 mm. Thus, the actual projection dimension of each ridge 154a, 154b, which is measured from the corresponding surface 152e, 152f of the insulator portion 152, is about 0.2 mm.

A contact surface area of the seal relative to the mating side (the flange portion 132, the glass plate 122) can be reduced by the ridge 154a, 154b. Therefore, the reliable seal can be made with a small compression force without requiring an excessive compression force.

In the second embodiment, it is described that the single touch panel side ridge 154a is formed in the surface 152e of the insulator portion 152, which is opposed to the touch panel 120, and the single front case side ridge 154b is formed in the surface 152f of the insulator portion 152, which is opposed to the flange portion 132. Alternatively, multiple touch panel side ridges 154a may be formed in the surface 152e of the insulator portion 152, and multiple front case side ridges 154b may be formed in the surface 152f of the insulator portion 152. Furthermore, if it is necessary, only one of at least one touch panel side ridge 154a and at least one front case side ridge 154b may be formed.

Other Embodiments

In each of the above embodiments, it is described that the bent section 152b is formed in the distal end part 152a of the insulator portion 152. However, the present disclosure is not limited to this construction, and the bent section 152b may be eliminated. In such a case, the position of the distal end part 152a may be set between the line position a of the opening 133 and the outer peripheral line position c of the display area 111a.

Furthermore, when the spacer of the black color is used as the spacer 150, the insulator portion 152 is less obstructive to the driver. Additionally, the touch panel 120 side surface of the insulator portion 152 may be surface textured. In this way, the small light reflection at the insulator portion 152 can be limited, and thereby an adverse influence, which is caused by the extension of the insulator portion 152, can be eliminated.

A subject area of the insulator portion 152, which is surface textured, may be, for example, an entire area of the touch panel 120 side surface of the insulator portion 152 in the first embodiment. In this way, even when the inner side line position b of the black print portion 121b and the line position of the opening 142a of the panel frame portion 142 are placed at any positions, respectively, the driver can see the surface texture, which is formed on the surface of the insulator portion 152, through the opening 142a. Therefore, it is possible to limit the reflection of the light at the insulator portion 152.

Alternatively, the subject area of the insulator portion 152, which is surface textured, may be limited only to a visible area of the insulator portion 152, which is visible to the driver through the opening 142a. For example, as indicated in a first modification of FIG. 4, a surface-textured part 158, which is surface textured, may be formed in an area (a minimum surface texture setting area Sa indicated by arrows in FIG. 4) of a surface 157 of the insulator portion 152, which is located on a side of the line of the direction A discussed in the first embodiment where the distal end of the insulator portion 152 is positioned. In this way, the surface texture is formed in the viewable surface of the insulator portion 152, which may possibly be viewed by the driver. Thereby, the reflection of the light by the insulator portion 152 can be limited.

Figure 4:
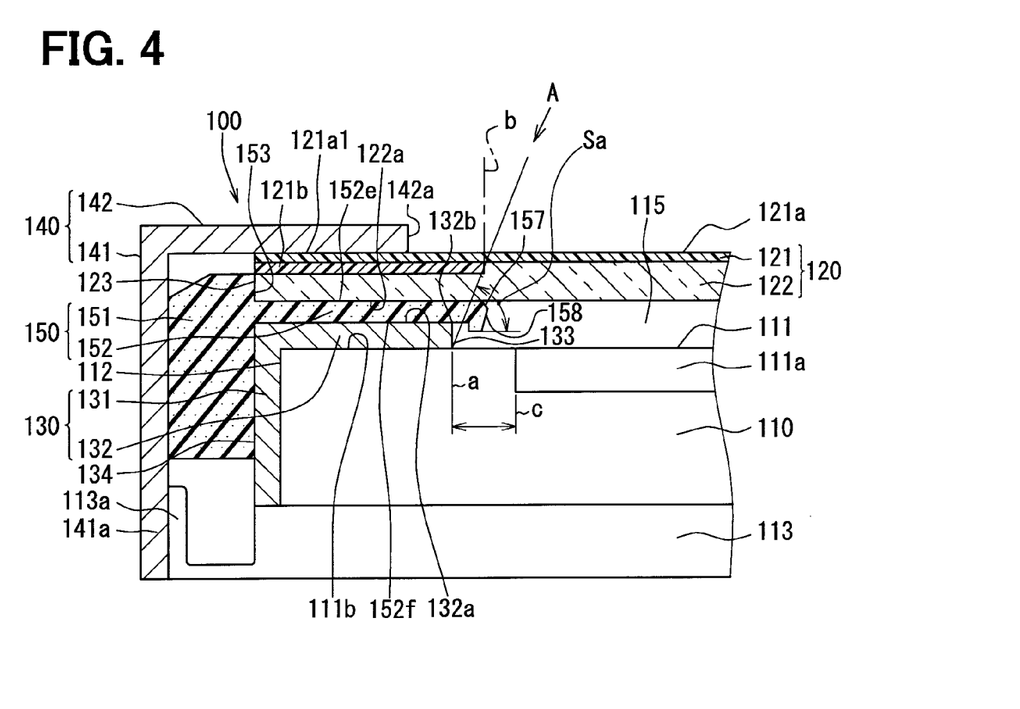
FIG. 4 is a partial cross-sectional view of a first modification of the display device according to the present disclosure, indicating a cross section of the display device, which corresponds to the cross section taken along line II-II in FIG. 1.

Furthermore, in a case where the inner side line position b of the black print portion 121b is displaced from the line position a of the opening 133 toward the outer peripheral cover portion 141 in FIG. 4, the surface-textured part 158 may be formed in the surface of the insulator portion 152, which can be viewed by the driver through the opening 142a or through the opening 142a and the inner side line position b regardless of the line of the direction A.

Figure 5:
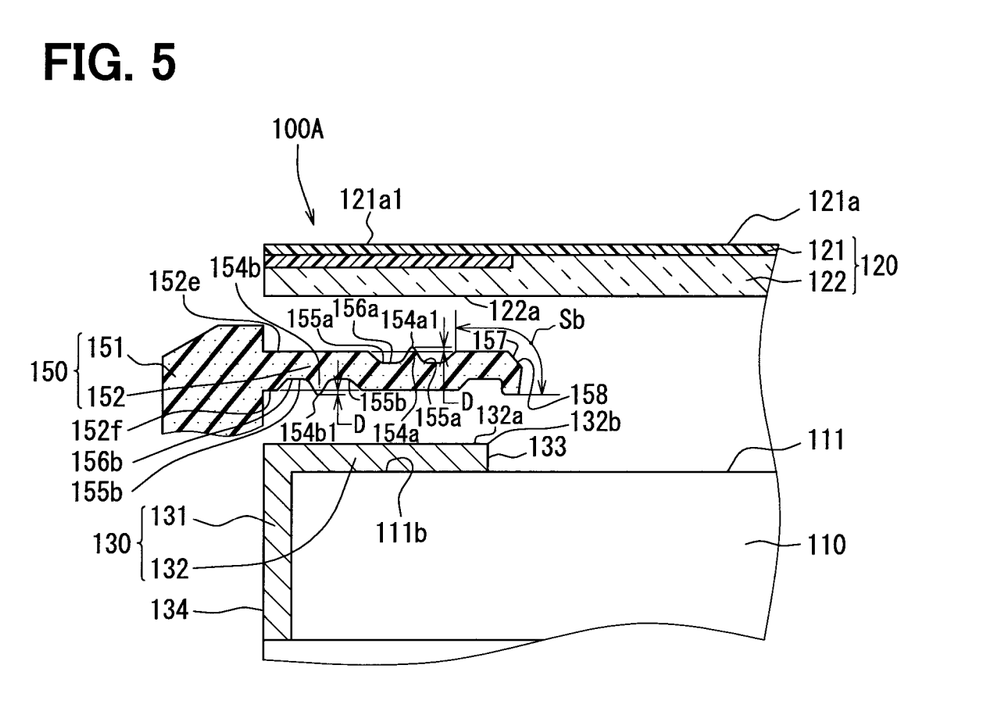
FIG. 5 is a partial cross-sectional view of a second modification of the display device according to the present disclosure, indicating a cross section of the display device, which corresponds to the cross section taken along line II-II in FIG. 1.

Furthermore, in the case where the ridges 154a, 154b, which are described in the second embodiment, are formed in the insulator portion 152, when the ridges 154a, 154b are surface textured, the seal effect of the ridges 154a, 154b may possibly be influenced. Therefore, it is desirable that the ridges 154a, 154b and the grooves 155a, 155b are not surface textured. Thus, as indicated in a second modification of FIG. 5, the ridges 154a, 154b and the grooves 155a, 155b may be set at a location, which cannot be viewed by the driver through the opening 142a, and the surface-textured part 158 may be formed in an area (a surface texture setting area Sb in FIG. 5) of the surface 157 of the insulator portion 152, which is located on the side of the ridges 154a, 154b and the grooves 155a, 155b where the distal end of the insulator portion 152 is placed.

In the case where the surface-textured part 158 is limitedly formed only in the part of the insulator portion 152 as discussed above, the area of the surface-textured part 158 can be minimized. Therefore, an area, which has recesses and projections to form the surface texture, can be minimized in the mold, which is used to mold the spacer 150 (the insulator portion 152). Therefore, the manufacturing costs of the mold can be reduced.

Furthermore, it is desirable to set a direction of parting surfaces of the mold in such a manner that an extending direction of burrs, which are formed in the distal end part 152a or the bent section 152b of the insulator portion 152 by the parting surfaces of the mold, is directed toward the display surface 111 rather than the extending direction of the insulator portion 152. In this way, the reflection of the small light by the burrs can be eliminated, so that deterioration of the visual quality of the display device appreciated by the driver can be eliminated.

Furthermore, in the above-described embodiments, it is described that the display device 100, 100A is used in the navigation system for the vehicle. However, the present disclosure is not limited to this application. The display device of the present disclosure may be applied to various apparatuses, such as a vehicle information display device, which displays various drive information of the vehicle, or an input operating device of a vehicle air conditioning apparatus and an A/C display device, which displays an operational state of the vehicle air conditioning apparatus.

What is claimed is:
1. A display device comprising:
a display unit that has a display surface;

a touch panel that is spaced from and is opposed to the display surface of the display unit in a direction perpendicular to the display surface, wherein the touch panel has an operating surface that is operable with a finger of a user to change display content of the display surface;

a front case that is made of metal and is configured into a frame form, wherein the front case covers at least an outer peripheral part of the display surface of the display unit;

a touch panel cover that includes:
- an outer peripheral cover portion, which is configured into a tubular form and covers outer peripheral surfaces of the display unit and of the touch panel; and
- a panel frame portion, which covers an outer peripheral part of the operating surface of the touch panel;

a spacer portion that is placed between the outer peripheral cover portion and the outer peripheral surfaces of the display unit and of the touch panel, wherein the spacer portion limits a position of the display unit and a position of the touch panel relative to the outer peripheral cover portion; and an insulator portion that is formed integrally with the spacer portion and is placed between the display unit and the front case, wherein the insulator portion forms a gap of a predetermined dimension between the display unit and the touch panel and seals between the front case and the touch panel to limit intrusion of dust into the gap, wherein:

an opening of the panel frame portion relative to the touch panel is formed to be larger than an opening of the front case relative to the display unit; and the insulator portion extends toward a center of the opening of the front case beyond an inner peripheral part of the front case in a direction parallel to the display surface of the display unit to mask the front case from eyesight of the user.

2. The display device according to claim 1, wherein a bent section, which is bent toward the display surface, is formed in an extended distal end part of the insulator portion.

3. The display device according to claim 1, wherein the insulator portion includes at least one of the followings:
a touch panel side ridge, which has a cross section that is tapered toward a distal end part of the touch panel side ridge in a direction perpendicular to a corresponding surface of the touch panel, wherein the touch panel side ridge contacts the corresponding surface of the touch panel at the distal end part of the touch panel side ridge; and a front case side ridge, which has a cross section that is tapered toward a distal end part of the front case side ridge in a direction perpendicular to a corresponding surface of the front case, wherein the front case side ridge contacts the corresponding surface of the front case at the distal end part of the front case side ridge.

4. The display device according to claim 3, wherein the insulator portion includes both of the touch panel side ridge and the front case side ridge.

5. The display device according to claim 3, wherein:
the touch panel side ridge projects from a bottom surface of a touch panel side recess of the insulator portion toward the corresponding surface of the touch panel;
the distal end part of the touch panel side ridge contacts the corresponding surface of the touch panel at an opening end of the touch panel side recess;
the front case side ridge projects from a bottom surface of a front case side recess of the insulator portion toward the corresponding surface of the front case; and
the distal end part of the front case side ridge contacts the corresponding surface of the front case at an opening end of the front case side recess.

6. The display device according to claim 3, wherein:
the distal end part of the touch panel side ridge makes a line contact with the corresponding surface of the touch panel; and
the distal end part of the front case side ridge makes a line contact with the corresponding surface of the front case.

7. The display device according to claim 1, wherein the spacer portion and the insulator portion are integrally and seamlessly molded from a resilient material.

8. The display device according to claim 1, wherein a surface-textured part, which is surface textured, is formed in a surface of the insulator portion, which is located on a side where the touch panel is located.

9. The display device according to claim 8, wherein the surface-textured part is formed at least in an area of the surface of the insulator portion, which is located on the side where the touch panel is located and is visually recognizable by the user through the opening of the panel frame portion.

* * * * *